(12) United States Patent
Choy et al.

(10) Patent No.: US 7,284,265 B2
(45) Date of Patent: Oct. 16, 2007

(54) SYSTEM AND METHOD FOR INCREMENTAL REFRESH OF A COMPILED ACCESS CONTROL TABLE IN A CONTENT MANAGEMENT SYSTEM

(75) Inventors: David Mun-Hien Choy, Los Altos, CA (US); Tawei Hu, San Jose, CA (US); Jy-Jine James Lin, Cupertino, CA (US); Yuping Wang, San Jose, CA (US); Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 10/131,659

(22) Filed: Apr. 23, 2002

(65) Prior Publication Data

US 2003/0200467 A1 Oct. 23, 2003

(51) Int. Cl.
*G06F 17/30* (2006.01)
*H04L 9/32* (2006.01)

(52) U.S. Cl. .............................. 726/6; 726/18; 726/27
(58) Field of Classification Search ................ 726/18, 726/6
See application file for complete search history.

(56) References Cited

U.S. PATENT DOCUMENTS

| | | | | |
|---|---|---|---|---|
| 5,390,312 A | | 2/1995 | Chiarot et al. ............... 395/400 |
| 5,495,533 A | * | 2/1996 | Linehan et al. .............. 713/155 |
| 5,552,776 A | * | 9/1996 | Wade et al. ................. 340/5.74 |
| 5,560,005 A | | 9/1996 | Hoover et al. ............... 395/600 |
| 5,627,987 A | | 5/1997 | Nozue et al. ................ 395/410 |
| 5,774,668 A | | 6/1998 | Choquier et al. ....... 395/200.53 |
| 5,941,947 A | | 8/1999 | Brown et al. ................. 709/225 |
| 6,014,666 A | | 1/2000 | Helland et al. ................. 707/9 |
| 6,052,785 A | | 4/2000 | Lin et al. ......................... 726/5 |
| 6,105,027 A | | 8/2000 | Schneider et al. .............. 707/9 |
| 6,141,754 A | | 10/2000 | Choy .......................... 713/200 |
| 6,161,139 A | | 12/2000 | Win et al. ..................... 709/225 |
| 6,195,705 B1 | | 2/2001 | Leung ......................... 709/245 |
| 6,256,715 B1 | | 7/2001 | Hansen ........................ 711/163 |
| 6,308,173 B1 | * | 10/2001 | Glasser et al. .................. 707/9 |
| 6,438,549 B1 | * | 8/2002 | Aldred et al. ................... 707/9 |
| 6,460,171 B1 | * | 10/2002 | Couvert et al. .................. 726/4 |
| 6,470,353 B1 | * | 10/2002 | Yaung et al. ............ 707/103 R |

(Continued)

FOREIGN PATENT DOCUMENTS

WO   WO9940502   8/1999

OTHER PUBLICATIONS

Dictionary.com, Retrieved online <URL:http://dictionary.reference.com/search?q=compile>, Compile, definition of.*

(Continued)

*Primary Examiner*—Kambiz Zand
*Assistant Examiner*—Thomas Szymanski
(74) *Attorney, Agent, or Firm*—Shelley M Beckstrand

(57) ABSTRACT

System and method for authorizing access to an entity by a user, by binding an access control list to each entity; specifying for the user a set of user privileges; intersecting the access control list and set of user privileges in a compiled ACL table; incrementally refreshing the compiled ACL table responsive to run time modification of relevant tables containing the access control list and set of user privileges; and referencing the compiled access control list to authorize a user request to access an entity.

25 Claims, 5 Drawing Sheets

U.S. PATENT DOCUMENTS

| | | | |
|---|---|---|---|
| 6,523,027 B1 | 2/2003 | Underwood | 707/4 |
| 6,581,060 B1* | 6/2003 | Choy | 707/9 |
| 6,609,128 B1 | 8/2003 | Underwood | 707/10 |
| 6,633,878 B1 | 10/2003 | Underwood | 707/100 |
| 6,718,535 B1 | 4/2004 | Underwood | 717/101 |
| 6,772,350 B1* | 8/2004 | Belani et al. | 726/2 |
| 6,823,338 B1* | 11/2004 | Byrne et al. | 707/9 |
| 6,823,452 B1 | 11/2004 | Doyle et al. | 713/156 |
| 6,976,023 B2 | 12/2005 | Chen et al. | 707/9 |
| 2001/0037379 A1 | 11/2001 | Livnat | 709/219 |
| 2002/0002577 A1* | 1/2002 | Garg et al. | 709/104 |

OTHER PUBLICATIONS

Thesaurus.com, Refresh (Synonyms), pp. 1-4 <URL:http://thesaurus.reference.com/browse/refresh> retrieved online Jul. 27, 2006.*

Dictionary.com, Refresh (Definition), pp. 1-3 <URL:http://dictionary.reference.com/browse/refresh> retrieved online Jul. 27, 2006.*

Dictionary.com, Update (Definition), pp. 1-2 <URL:http://dictionary.reference.com/browse/update> retrieved online Jul. 27, 2006.*

Dictionary.com, Incremental (Definition), pp. 1-2 <URL:http://dictionary.reference.com/browse/incremental> retrieved online Jul. 27, 2006.*

Chan et al, "Incremental Update to Aggregated Information for Data Warehouses over Internet", 2000, ACM, pp. 57-64.*

*IBM Content Manager for Multiplatforms System Administration Guide*, Version 7.1. USA: IBM Corporation Doc. No. SC27-0868-00, First Edition (Jan. 2001). [Accessed Mar. 27, 2002 2:27 PM at http://www-4.ibm.com/software/data/cm/pubs/cm71/sysadm/frns2mst02.htm].

*System and Method for RDBMS to Protect Records in Accordance with Non-RDBMS Rules*. IBM Docket No. AM9-99-0207.

Okamoto, Tatsuaki. *A Single Public-Key Authentication Scheme for Multiple Users*. Systems and Computer in Japan, vol. 18, No. 10, 1987.

Sandhu et al. 'NetWare 4 as an Example of Role-Based Access Control'. ACM Press, 1996. 12 pages.

Crall, Chris et al. *Authorization in Enterprise-wide Distributed System A Practical Design and Application*. Proceedings 14th Annual Computer Security Applications Conference. Los Alamitos, CA: IEEE Comput. Soc., 1998. 12 pages.

Kavaln, Vasanthi et al. *A Mobile Agent for Asynchronous Administration of Multiple DBMS Servers*. Proceedings of the IEEE Third International Workshop on systems Management. Los Alamitos, CA: IEEE Compt. Soc., 1998. 1-2.

Hayton, Richard et al. *An Open Architecture for Secure Interworking Services*. Proceedings of the 17th International Conference on Distributed Computing Systems. Los Alamitos, CA: IEEE Comput. Soc. Press, 1997. 315-321.

Han, Yan et al. *Constraint Specification for Object Model of Access Control Based on Role*. Software Engineering Notes, vol. 25, No. 2, Mar. 2000. USA: ACM. 60-64. [Inspec Abstract AN 6580279, ABN C2000-06-6130S-023].

IBM Corp. *Content Manager for Multiplatforms*. Wysiwyg://2/http://www-4.ibm.com/software/data/cm/cmgr/mp/about.html; and Wysiwyg://1/http://www-4.ibm.com/software/data/cm/cmgr/mp [accessed Mar. 26, 2002 5:13 PM].

* cited by examiner

| SYSTEM CONTROL TABLE | | | | | |
|---|---|---|---|---|---|
| DATABASE NAME | ACL BINDING LEVEL | LIBRARY ACL CODE | PUBLIC ACCESS ENABLED | ALLOW TRUSTED LOGON | |
| 102 | 104 | 106 | 108 | 105 | |

| USERS TABLE | | | | | | |
|---|---|---|---|---|---|---|
| USER ID | USER KIND | USER PRIVILEGE SET CODE | GRANT PRIVILEGE SET CODE | DEFAULT ACL CODE | PASSWORD | USER NAME |
| 130 | 140 | 142 | 146 | 148 | 156 | 152 |

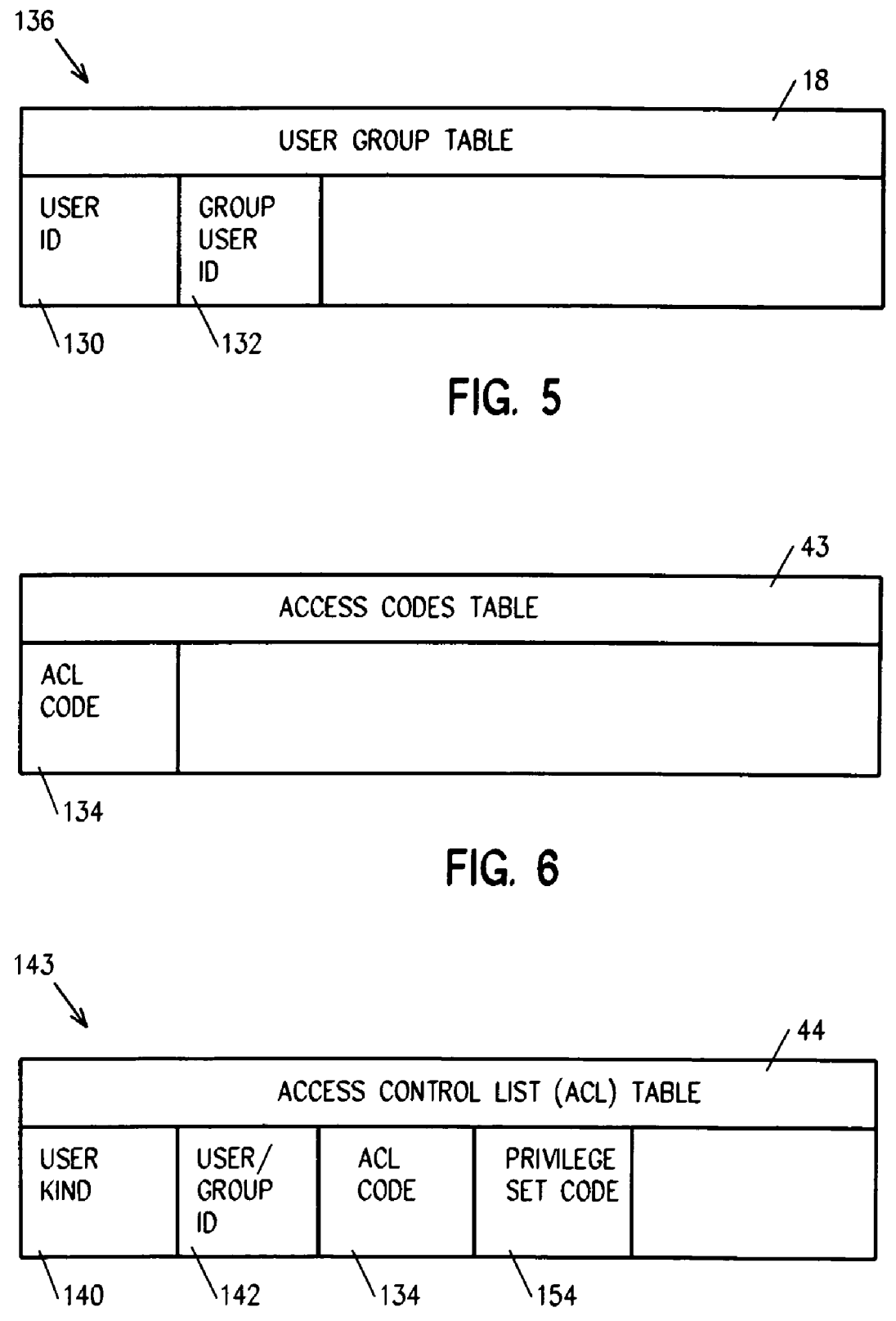

USER GROUP TABLE (136, 18)

| USER ID (130) | GROUP USER ID (132) | |
|---|---|---|

FIG. 6

ACCESS CODES TABLE (43)

| ACL CODE (134) | |
|---|---|

FIG. 7

ACCESS CONTROL LIST (ACL) TABLE (143, 44)

| USER KIND (140) | USER/ GROUP ID (142) | ACL CODE (134) | PRIVILEGE SET CODE (154) | |
|---|---|---|---|---|

SYSTEM AND METHOD FOR INCREMENTAL REFRESH OF A COMPILED ACCESS CONTROL TABLE IN A CONTENT MANAGEMENT SYSTEM

BACKGROUND OF THE INVENTION

CROSS REFERENCES TO RELATED APPLICATIONS

U.S. patent applications Ser. No. 10/131,651, filed 23 Apr. 2002 (pending), entitled "SYSTEM AND METHOD FOR MANAGING APPLICATION SPECIFIC PRIVILEGES IN A CONTENT MANAGEMENT SYSTEM", Ser. No. 10/131,008, filed 23 Apr. 2002 (pending), entitled "SYSTEM AND METHOD FOR ENSURING SECURITY WITH MULTIPLE AUTHENTICATION SCHEMES", and Ser. No. 10/131,634, filed 23 Apr. 2002 (pending), entitled "SYSTEM AND METHOD FOR CONFIGURABLE BINDING OF ACCESS CONTROL LISTS IN A CONTENT MANAGEMENT SYSTEM", filed concurrently herewith, are assigned to the same assignee hereof and contain subject matter related, in certain respect, to the subject matter of the present application. The above-identified patent applications are incorporated herein by reference.

TECHNICAL FIELD OF THE INVENTION

This invention relates to data security in a content management system. More particularly, it relates to incremental refresh of a compiled access control table.

BACKGROUND ART

In a content management system, access to data objects, such as files, folders, databases, and other data elements may be controlled through the use of privilege sets, users and user groups, and access control lists.

Users are individuals who are identified as authorized to log on to the system, and user groups are groups of users with common access needs. Each user is assigned a password, privilege set, collection, and object server.

A privilege set identifies the functions that a user can perform, such as creating folders or adding objects to a workbasket. When a user, already determined to be a user authorized to use the system, makes a request of the system, the system checks the user's privilege set to ensure that the user is allowed to perform the requested function.

An access control list (ACL) protects access to the objects (also referred to as items) in the system. An access control list is assigned to each index class, workbasket, and workflow object when it is created. When a logged on user attempts to access an object, the system first checks the user's privilege set to ensure that the user is allowed to perform the requested function, and then checks the access control list for that object to ensure that the user is allowed to perform the requested function on that object. Thus, an access control list may be used to remove otherwise privileged functions—that is, functions which a user is authorized to perform by his privilege set may be denied with respect to a particular object. The result is, that to resolve authorization for a user operating on an item, several system tables must be accessed repetitively. The runtime overhead of such procedural process is a major performance concern.

It is an object of the invention to provide an improved system and method for authorizing access to items.

SUMMARY OF THE INVENTION

System and method for authorizing access to an entity by a user, by binding an access control list to each entity; specifying for the user a set of user privileges; intersecting the access control list and set of user privileges in a compiled ACL table; and incrementally refreshing the compiled ACL table responsive to run time modification of the access control list or set of user privileges.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 illustrates the system control table 31 of FIG. 2.

FIG. 4 illustrates the user table 16 of FIG. 2.

FIG. 5 illustrates the user group table 18 of FIG. 2.

FIG. 6 illustrates the access codes table of FIG. 2.

FIG. 7 illustrates the access control list (ACL) table 44 of FIGS. 1 and 2.

DETAILED DESCRIPTION OF PREFERRED EMBODIMENTS

In accordance with the preferred embodiment of the invention, a system and method is provided for managing data security in a content management system, including incremental refresh of a compiled access control table.

Figure 1:
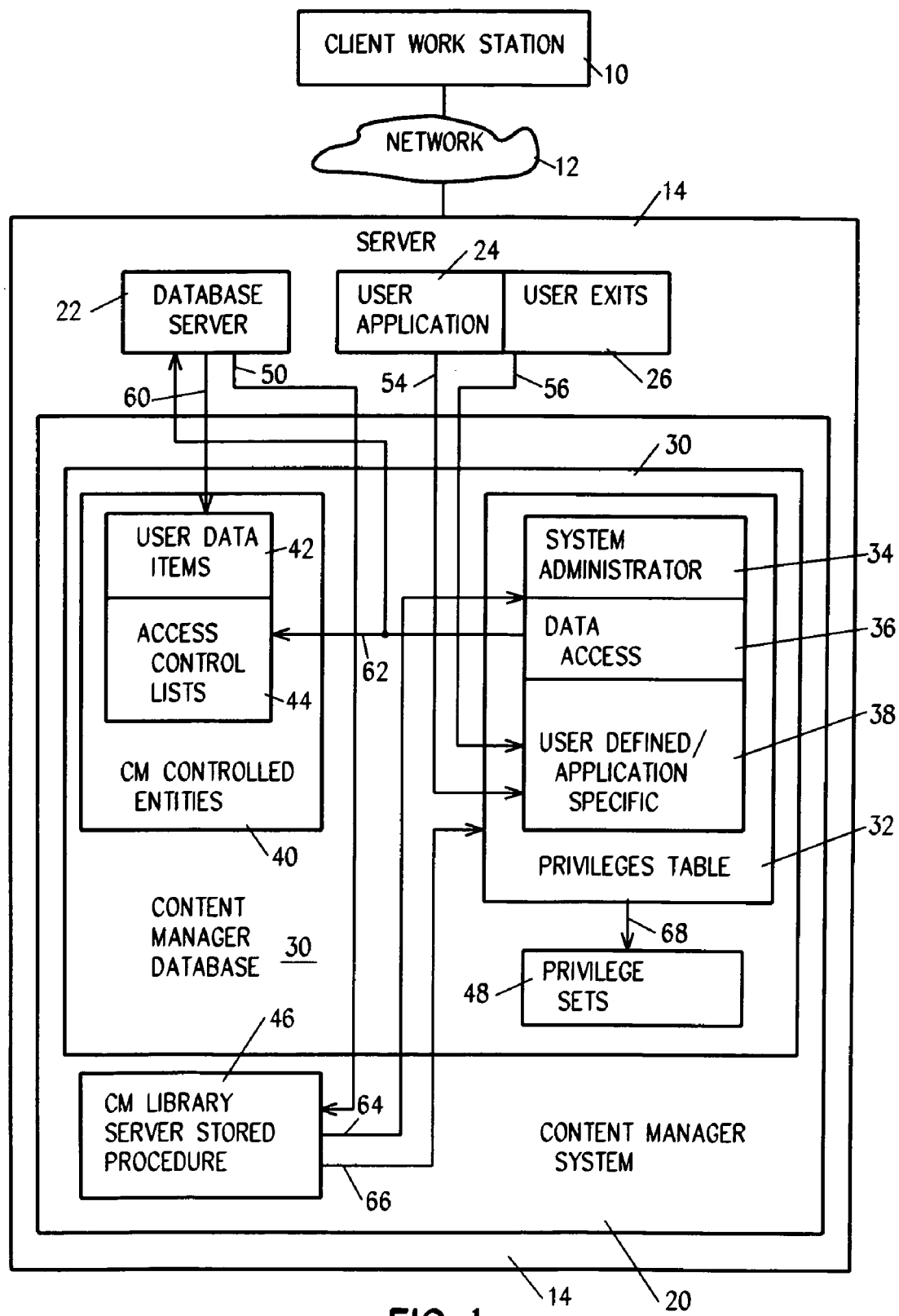
FIG. 1 is a high level diagram illustrating basic components of an exemplary embodiment of the system of the invention.

Referring to FIG. 1, in an exemplary embodiment of the system of the invention, a user at a client workstation 10 is connected through network 12 to a server 14 which includes a content manager system 20, a database server 22, user applications 24 and exits 26. Content manager system 20 includes content manager database 30 and stored procedures 46, which procedures 46, among other things, define the methods and tasks executed by content manager system 20 with respect to the tables of database 30. System database 30 includes content manager controlled entities 40, a privileges table 32, privileges sets 48, and several other tables including those shown in FIG. 2.

Figure 2:
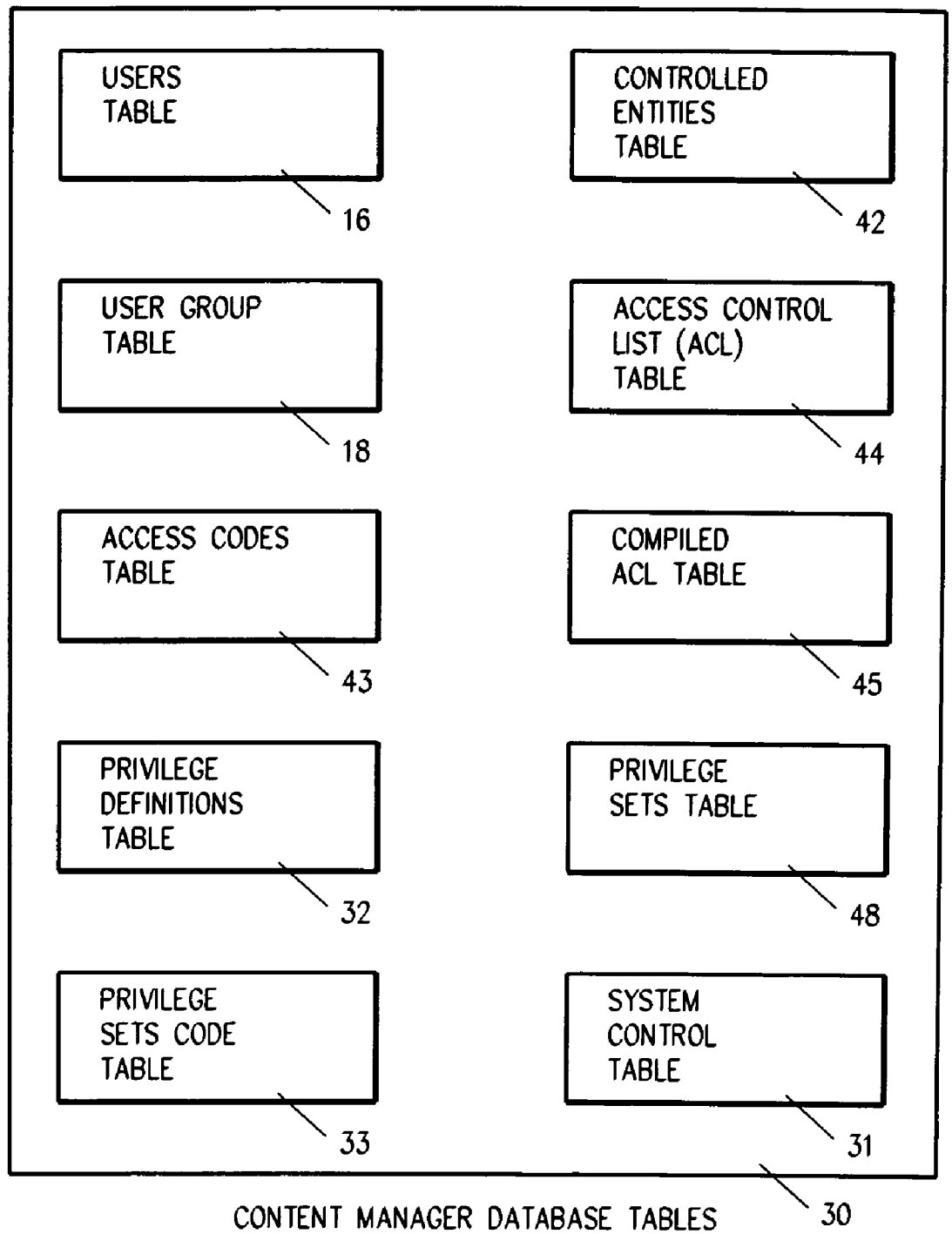
FIG. 2 is a high level diagram illustrating various tables for implementing a preferred embodiment of the system of the invention.

Referring to FIG. 2, access to entity 42 is managed through the use of several tables, including in this preferred embodiment of the invention users table 16, user groups table 18, access codes table 43, privilege definitions table 32, privilege sets code table 33, access control list (ACL) table 44, compiled ACL table 45, and privilege sets table 48.

Referring to FIG. 3, system control table 31 stores system configuration parameters for CM library server 20. Columns of table 31 include database name 102, ACL binding level 104, library ACL code 106, and public access enabled flag 108. Database name 102, an installation parameter, is the name of the library server 22. ACL binding level 104 is the access control level having, as valid values, 0 at item type level (default), 1 at item level, 2 at mixed item and item type level, and 3 at entire library level. Library ACL code 106 contains the ACL to be associated with all CM item types and items 40 if the parameter ACL binding level 104 is configured at library level. Public access enabled flag 108 indicates whether the capability of opening a bound entity public to public is enabled. When this column 108 is updated, system 20 rebuilds compiled ACL tables 45 and recreates all database table 30 views.

Referring to FIG. 4, users table 16 maintains a catalog of individual users and user groups 141. Individual users 141 can belong to none or any number of groups. Users must be assigned a number of privileges, stored in user privilege set code table 33. Defining new CM users 136 does not guarantee their existence in the data base management system (DBMS) and the operating system. The system administrator ensures the usefulness of the CM users 141 he creates. A group is a number of zero or more users 141, usually with the same job description, and assigned the same privilege set 158. A group 136 cannot belong to other groups. A group 136 does not hold default privileges for its members, nor do they relate to data base management system (DBMS) or operating system groups. Defining groups 136 minimizes the effort required to administer ACLs 143.

User table 16 columns include user ID 130, user kind 140, user privilege set code 142, grant privilege set code 146, default ACL code 148, password 156, and user name 152. User ID 130 is the ID of the individual user or group. For an individual user 141, user ID 130 should match his DBMS user ID. The CM 20 uses this value for user authentication and access control. For a group 141, user ID 130 contains the group name. User kind 140 indicates whether this entry 141 represents an individual user or a group. User privilege set code 142 denotes the user privileges for this user 141. The privilege set 158 must be defined first, and this value is not valid for groups. It is set to 1 by CM system 20 for groups. User privilege set code 142 may be updated. Grant privilege set code 146 is the code assigned to new users 141 by a user 141 who is authorized to create users but not grant privileges to the new users. This value 146 is not valid for groups, and it can be updated. A system administrator GUI for creating a user 141 must have an entry field for that user's grant privilege set code 146. Default ACL code 148 is used to associate with items 42 when the access control 104 is configured at item level if this user 141 does not provide an ACL code when he creates items 42. Password 156 is the encrypted user password. User name 152 is the full name of this user or group 141.

Referring to FIG. 5, users group table 18 maintains associations of individual users 141 with groups 136. The columns of table 18 are user ID 130 and group user ID 132. An individual user 141 can belong to none or any number of groups 141. A group 141 cannot belong to other groups. When an individual user 141 is associated with a group 141, the user is said to be a member of that group. Associating individual users with groups in user group table 18 by a row 136 having a user ID 130 associated with a group ID 132 simplifies access control management. When defining access control specifications 143, a group 141 can be granted a number of privileges instead of granting the same set of privileges 158 to each user 141 in the group. The individual user 141 and the group 141 must be defined in the users table 16 before an association in user group table 18 can be made between the user ID 130 and the group ID 132. Rows in this table can only be deleted, not updated.

Referring to FIG. 6, access codes table 43 maintains the access control list identifiers 134. Each list 143 is uniquely identified by the access list code 134 which is generated by CM system and cannot be updated. The list specifications are stored in the access control list table 44. ACL name and description are defined in a separate keywords table (not shown). Table I sets forth an exemplary list of pre-configured ACL codes 134.

TABLE I

CM Pre-configured ACL Codes

| ACLCode 134 | ACLName* | ACLDesc* |
|---|---|---|
| 1 | SuperUserACL | ACL allows CM pre-configured user ICMADMIN to perform all CM functions on the bound entities 40. |
| 2 | NoAccessACL | ACL specifies, for all CM users, no actions are allowed on the bound entities 40. |
| 3 | PublicReadACL | ACL allows all CM users to read the bound entities 40. |

*For illustration only. Name and description are defined in a keywords table (not shown).

Referring to FIG. 7, access control list (ACL) table 44 maintains the access control list specifications. The columns of table 44 include user kind 140, user/group ID 142, ACL code 134, and privilege set code 154. ACL code 134 is the ID of an access control list. Access control lists are used by the access control algorithm to determine a user's access rights for an item 44. User ID 142 contains the ID 130 for an individual user 141 or for a group 141. User kind 140 interprets the User ID column 130 as public, group, or individual. If user kind 140 is public, the value in user ID column 130 is ignored. Privilege set code 154 is the Privilege Set 158 identifier, which indicates the operations allowed for the bound item 42. A list may contain more than one control 143, and comprises all rows 143 having the same ACL code 134. Each control 143 is composed of two elements: who (user ID 142, user kind 140) can perform what (privilege set code 154). Each CM data entity (Item) 42 must be bound to a control list in table 44. The control specifications 143 then will be enforced when items 42 are accessed. Table II is an exemplary list of pre-configured access control lists.

TABLE II

Pre-configured Access Control Lists

| ACLCode 134 | UserID 142 | UserKind 140 | PrivSetCode 154 |
|---|---|---|---|
| 1 (SuperUserACL) | ICMADMIN | 0 | 1 (AllPrivSet) |
| 3 (PublicReadACL) | ICMPUBLC | 2 (public) | 6 (ItemReadPrivSet) |

Figure 8:
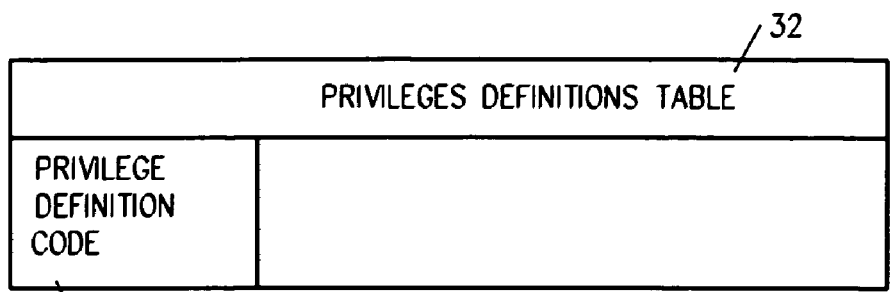
FIG. 8 illustrates the privileges definitions table of FIG. 2.

Referring to FIG. 8, privileges definitions table 32 maintains an unlimited number of CM privilege definitions, including both CM system defined privilege definitions 34, 36 and user defined privileges 38. System defined privileges 34, 36 cannot be modified. Each privilege has a system 20 generated unique privilege definition code 150 as a primary key. Codes 0 to 999 are reserved to store CM system 20 defined privileges 34, 36. 1000 and up are open for user defined privileges 38. When defining or updating privilege sets 48, this table 32 can be first queried to list all defined privileges 34–38. Applications 24 can also query this table 32 at runtime to get the definitions of the connected user's privileges and customize the application menu selections specifically suitable for that user (at client workstation 10). Privilege name and description are defined in a keywords table (not shown). Table III provides a exemplary set of system defined system administrator privilege definitions 34 and data access privilege definitions 36, showing privilege definition code 150 and corresponding example privilege definition names and privilege definition descriptions.

TABLE III

System Defined Privilege Definitions

| Priv Def Code 150 | PrivDefName* | PrivDefDesc* |
|---|---|---|
| Sys Admin 34 | | |
| 40 | SystemAdmin | The CM system administration privilege. |
| 41 | SystemQuery | The privilege to query CM system information. |
| 42 | SystemDefineUser | The privilege to create and update users. |
| 43 | SystemQueryUserPriv | The privilege to query other user's privileges. |
| 44 | SystemGrantUserPriv | The privilege to grant other user's privileges. |
| 45 | SystemDefineItemType | The privilege to query, create, update and delete Item Types and Attributes. |
| Data Access 36 | | |
| 120 | ItemSuperAccess | The privilege to bypass ACL check. |
| 121 | ItemSQLSelect | The privilege to select Items using SQL interface. |
| 122 | ItemTypeQuery | The privilege to query Item Type and Attribute definitions. |
| 123 | ItemQuery | The privilege to query Items. |
| 124 | ItemAdd | The privilege to create Items. |
| 125 | ItemSetUserAttr | The privilege to update Item's user-defined attribute values. |
| 126 | ItemSetSysAttr | The privilege to update Item's system-defined attribute values. |
| 127 | ItemDelete | The privilege to delete Items. |
| 128 | ItemMove | The privilege to move Items between Item Types. |
| 129 | ItemLinkTo | The privilege to heterogeneously link Items to other Items (make the Items foreign key children). |
| 130 | ItemLinked | The privilege to set Items to be heterogeneously linked by other Items (make the Items foreign key parents). |
| 131 | ItemOwn | The privilege to set Items to own a collection of Items. |
| 132 | ItemOwned | The privilege to set Items to be owned by other Items. |

*For illustration only. Name and description are defined in an NLS Keywords table (not shown).

Figure 9:
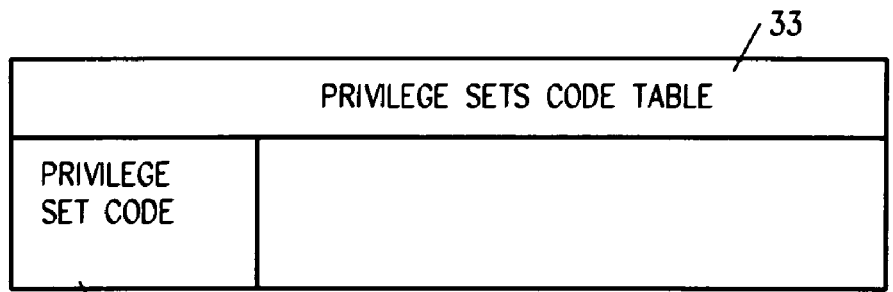
FIG. 9 illustrates the privilege sets code table 33 of FIG. 2.

Referring to FIG. 9, privilege sets code table 33 maintains privilege set definitions. A privilege set comprises an unlimited number of privileges. Each set is uniquely identified by a CM system 20 generated code, privilege set code 154. Its set member associations are stored it privilege sets table 48. Privilege set name and description are defined in a keywords table (not shown). Table IV gives an exemplary set of pre-configured privilege set codes 154 together with privilege sets names and descriptions.

TABLE IV

CM Pre-configured Privilege Set Codes

| Priv Set Code 154 | PrivSetName* | PrivSetDesc* |
|---|---|---|
| 1 | AllPrivSet | Users with this Privilege Set can perform all CM functions on all CM library entities 40. |
| 2 | NoPrivSet | Users with this Privilege Set cannot perform any CM functions on any CM library entities 40. |
| 3 | SystemAdminPrivSet | Users with this Privilege Set can perform all CM system administration and data modeling functions. |
| 4 | ItemAdminPrivSet | Users with this Privilege Set can perform all CM data modeling and Item 42 access functions. |
| 5 | ItemLoadPrivSet | Users with this Privilege Set can load Items 42 into CM library 40. |
| 6 | ItemReadPrivSet | Users with this Privilege Set can search and view CM Items 44. |
| 7 | ICMConnectPrivSet | Users with this privilege set can logon with a different UserID than the one used to Connect (Connect or database 30 UserID 130). |

*For illustration only. Name and description are defined in a keywords table (not shown).

Figure 10:
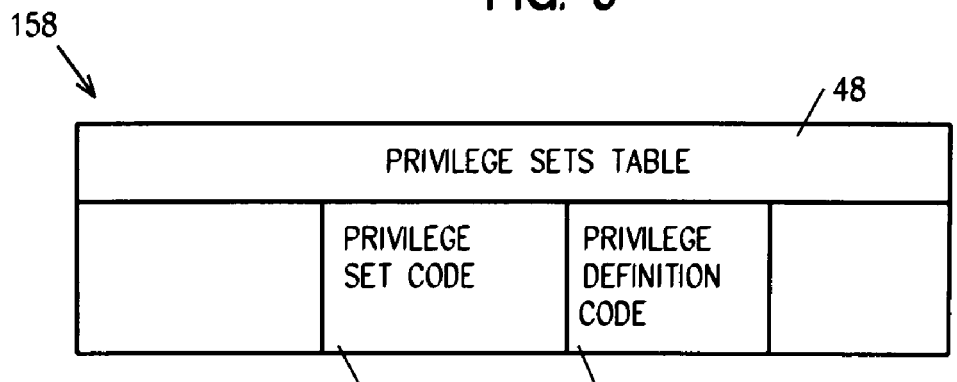
FIG. 10 illustrates the privilege sets table 48 of FIGS. 1 and 2.

Referring to FIG. 10, privilege sets table 48 maintains associations of CM privileges with the privilege sets. Rows 158 with the same privilege set code 154 form a privilege set. Rows 158 in this table 48 can only be deleted, not updated. Columns in privilege sets table 48 include privilege set code 154 and privilege definition code 150. Table V sets forth a collection of exemplary pre-configured privilege sets.

TABLE V

Pre-configured Privilege Sets

| Priv Set Code 154 | Priv Def Code 150 | PrivSetName* | PrivDefName* |
|---|---|---|---|
| 1 | 40 | AllPrivSet | SystemAdmin |
| 1 | 41 | | SystemQuery |
| 1 | 42 | | SystemDefineUser |
| 1 | 43 | | SystemQueryUserPriv |
| 1 | 44 | | SystemGrantUserPriv |
| 1 | 45 | | SystemDefineItemType |
| 1 | 120 | | ItemSuperAccess |
| 1 | 121 | | ItemSQLSelect |
| 1 | 122 | | ItemTypeQuery |
| 1 | 123 | | ItemQuery |
| 1 | 124 | | ItemAdd |
| 1 | 125 | | ItemSetUserAttr |
| 1 | 126 | | ItemSetSysAttr |
| 1 | 127 | | ItemDelete |
| 1 | 128 | | ItemMove |
| 1 | 129 | | ItemLinkTo |
| 1 | 130 | | ItemLinked |
| 1 | 131 | | ItemOwn |
| 1 | 132 | | ItemOwned |
| 3 | 40 | SystemAdminPrivSet | SystemAdmin |
| 3 | 45 | | SystemDefineItemType |
| 4 | 45 | ItemAdminPrivSet | SystemDefineItemType |
| 4 | 121 | | ItemSQLSelect |
| 4 | 122 | | ItemTypeQuery |
| 4 | 123 | | ItemQuery |

TABLE V-continued

Pre-configured Privilege Sets

| Priv Set Code 154 | Priv Def Code 150 | PrivSetName* | PrivDefName* |
|---|---|---|---|
| 4 | 124 | | ItemAdd |
| 4 | 125 | | ItemSetUserAttr |
| 4 | 126 | | ItemSetSysAttr |
| 4 | 127 | | ItemDelete |
| 4 | 128 | | ItemMove |
| 4 | 129 | | ItemLinkTo |
| 4 | 130 | | ItemLinked |
| 4 | 131 | | ItemOwn |
| 4 | 132 | | ItemOwned |
| 5 | 124 | ItemLoadPrivSet | ItemAdd |
| 5 | 128 | | ItemMove |
| 5 | 130 | | ItemLinked |
| 5 | 132 | | ItemOwned |
| 6 | 121 | ItemReadPrivSet | ItemSQLSelect |
| 6 | 123 | | ItemQuery |
| 7 | 1 | ICMConnectPrivSet | AllowConnectToLogon |

*For illustration only. Name and description are defined in the NLS Keywords table.

Figure 11:
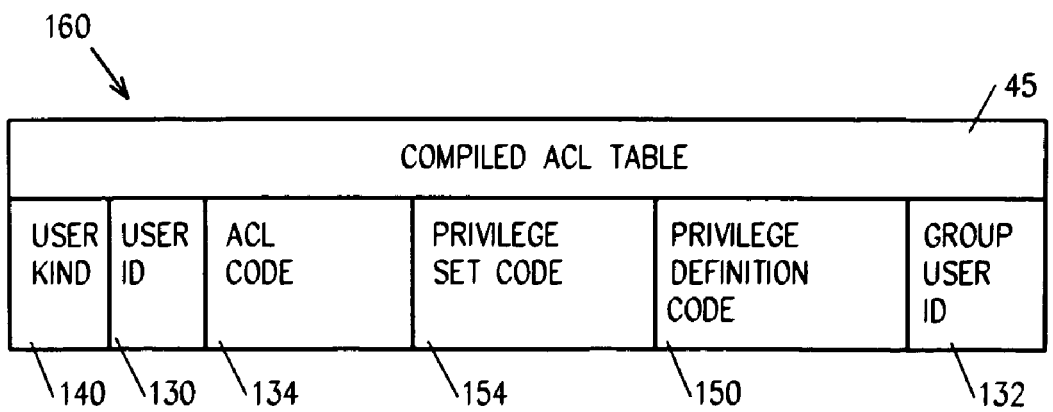
FIG. 11 illustrates the compiled ACL table 45 of FIG. 2.

Referring to FIG. 11, compiled ACL table 45 contains the compiled access control information. Columns in table 45 include user kind 140, user ID 130, ACL code 134, privilege set code 154, privilege definition code 150, and group user ID 132. User ID 130 contains only individual users. For each row 160 in compiled ACL table 45, privilege definition code 150 represents a single privilege for access to item 42. ACL code 134 is the access control list code. Privilege definition code 150 indicates the operation allowed for bound item 42. Privilege set code 154 is the privilege set code that the resolved privilege is derived from. This is a maintenance field, designed for incremental refresh on this table. For example, when a privilege set 158 is modified, rows 160 with the corresponding privilege set code 154 are affected, while other rows 160 are not. User ID 130 contains the authorized user's User ID. Group user ID 132 contains the group's User ID if this entry 160 is derived from an ACL rule for group. This column 132 provides a maintenance field, designed for incremental refresh. It contains null if the ACL rule user kind 140 is not for group. User kind 140 indicates which ACL rule type this row 160 is derived from: public, group or individual user.

Access Control List Table

In accordance with an exemplary embodiment of the invention, an access control list (ACL) 44 comprises one or more access control rules 143. Each ACL rule 143 is assigned a unique identifier referred to as an access control list code (ACL code) 134.

An access control rule 143 (a row in ACL table 44) specifies which users 130, 132 (users, groups, or public from users table 16 or user group table 18) can perform what functions. Access control rules 143 with the same ACL code 134 from access codes table 43 form an ACL list. The rule definitions 134 from access codes table 43 and the associations of rules with ACL codes 134 from access codes table 43 are maintained in ACL table 44.

A CM controlled entity 42 is bound to a specific ACL 143 through the ACL code 134. When associated with CM controlled entities 42, ACLs 143 define the authorization of the bound entities 42 and do not circumvent user privileges 48. ACL 44 is enforced in addition to the user privileges 48 check.

The user 142 specified in access control rules 143 can be individual users 130, groups 132, or public. The interpretation is determined by user kind field 140 of a rule 143. The types of rules, for illustration purposes, can be given the names ACL rule 143 for user (user kind 140=user), ACL rule 143 for group (user kind 140=group), and ACL rule 143 for public (user kind 140=public), respectively. By specifying public, the ACL Rule 143 for public authorizes all the users 141 to perform operations specified in the ACL privileges 134 on the bound entity 42, provided the users pass their user privileges 154 check on ACL table 44. The ACL privileges 134 on the bound entity to public (user kind 140=public) can be configured in system level. The configuration parameter is named public access enabled (defined in system control table 31 column 108). When public access enabled 108 is disabled, all the ACL rules 134 for public are ignored during the access control process.

Within the same ACL 44, a user 142 may be specified in more than one type of rule. The precedence of the three types, from highest to lowest, is ACL rule for public (user kind 140=public), ACL rule for user (user kind 140=user), ACL rule for group (user kind 140=group). When applying ACL 44 checks, if any higher-precedence rule type passes, the authorization is resolved and the process stops. If the check for ACL rule 44 for public failed, the checking process will continue on the lower-precedence rule types.

If the check for ACL Rule 44 for user failed, however, the checking stops; i.e., the ACL rule for group will not be checked. The access control check for individual user type and group type is not a sequential process, but an either-or process. If the user 130 is failed on an individual user type check (or the user does not have a rule in access list table 44), the checking process continues on to group type. If the user 130 belongs to one of groups 132 and the check of privilege 48 passes, the authorization is resolved (that is, allowed) and the process stops, otherwise, authorization is denied and the process also stops. When a user 130 is specified in more than one ACL rule 44 for group, the user is authorized by the union of all those rules 44 ACL Privileges 134/136. A user 130 is never specified in more than one ACL rule 44 for user.

Compiled ACL table 45 contains the compiled results of access control specifications and must be refreshed when the specifications or configuration that affects the specifications are changed. Ideally, the refresh should occur spontaneously and transparently to the users. As such refresh may be time-costly, content manager system 20 provides both the on-line and off-line refresh mechanisms.

Compiled ACL Table Total Refresh

There are two approaches for refreshing this table 45: total refresh and incremental refresh. Total refresh is desired for initial table population, migration and maintenance. It is straight forward in implementation, but time-consuming when executed. It is suitable for off-line execution. Incremental refresh shortens the process time, but complicates the implementation. Since accounting for the access control specification changes for an off-line incremental refresh is a non-trivial task, this approach is generally only applied to on-line execution. Table VI is a pseudo-code representation of the access control algorithm for content manager controlled entities, and is initially executed during total refresh.

TABLE VI

ACCESS CONTROL ALGORITHM FOR CM CONTROLLED ENTITIES

```
get current user 130 privileges 154
if user privileges 154 allow the operation with super
access capability
        return granted -- bypass ACL 44 check
if user privileges 154 do not allow the operation
        return denied
now, already authorized by the user privileges
        get the Item's ACL code 134
try ACL rule 134 for public (user kind 140 = public)
first
if configuration parameter PubAccessEnabled is true
        for each ACL Rule 44 for public
                if ACL privileges 134 allow the operation
                        return granted
continue trying other types of rules
if exists an ACL rule 44 for user for this user 142
        if ACL privileges 134 allow the operation
                return granted
        else
                return denied -- do not try any ACL Rule 44
for group (user kind 140 = group)
else for each ACL rule 44 for group that contains the
user 130
        if ACL privileges 134 allow the operation
                return granted
return denied -- either denied or user 130 is not
qualified for any rule 44
```

Compiled ACL table 45 contains resolved access control information, meaning that each row in the table represents an authorized privilege (privilege definition code 150—intersected by user privileges 154 and ACL privileges 144) for a user (user name) 142 that is defined in an ACL rule 44 ACL code 134. Thus, privilege definition code 150 is determined if both user privilege (i.e, the general privilege 142) and the ACL privileges 143 show that this user 130 is involved (authorized) . In this manner, compiled ACL table 45 is built. When accessing an item 42, this table 45 is joined on the item's 42 ACL code 134, constrained by the runtime user's name 142 and the desired privilege 150. If such a row exists in compiled ACL table 45, the operation on that item 42 is allowed. Otherwise, it is denied. That is, at runtime, compiled ACL table 45 will be joined by the ACL (i.e., ACL code 134) associated with the specific document 42 that is filtered out by (i.e. constrained or identified by) user name 130 and the desired privilege. In this manner, content manager 20 performs an ACL code 134 lookup in the compiled ACL table 45 with a given user name (user name 152 or user ID 130) and a desired privilege 150.

Initially, compiled ACL table 45 is populated using the access control algorithm described in Table VI. This process is time consuming, and were it the only way to populate compiled ACL table 45 would require that the compiled ACL table 45 be rebuilt whenever an update occurs in the relevant system tables, which include in this exemplary embodiment, system tables 16, 18, 43, 44, 32, 33, 48.

Compiled ACL Table Incremental Refresh

In accordance with the preferred embodiment of the invention, an incremental refresh method is selectively executed to update compiled ACL table 45 whenever those relevant tables that affect the compiled table have been changed when the system is running. Incremental refresh occurs when the scenarios of Table VII occur, hereafter described per scenario.

TABLE VII

INCREMENTAL REFRESH SCENARIOS

| Scenario | Table | Row Being |
|---|---|---|
| 1 | ICMSTAccessLists 44 | inserted |
| 2 | | updated |
| 3 | | deleted |
| 4 | ICMSTAccessCodes 43 | inserted |
| 5 | | deleted |
| 6 | ICMSTUserGroups 18 | inserted |
| 7 | | deleted |
| 8 | ICMSTUsers 16 | inserted |
| 9 | | updated |
| 10 | | deleted |
| 11 | | inserted |
| 12 | ICMSTPrivSets 48 | inserted |
| 13 | | deleted |
| 14 | ICMSTPrivSetCodes 33 | deleted |
| 15 | ICMSTPrivDefs 32 and ICMSTPrivSets 48 | inserted |
| 16 | | deleted |

Incremental Refresh Scenarios

According to system control setting to Public Enabled/Disabled, the scenario occurs whenever above table in the Table column has been changed:

1. Add entries into compiled ACL table 45 for the new inserted ACL rule 143 for a user—based on ACL code 134 and user ID 130.
2. Remove and then add entries in compiled ACL table 45 for the existing user 130 who has changed the current ACL rule 44 settings—search for ACL Code 134 and user ID 142.
3. Remove entries from compiled ACL table 45 with deleted ACL rule 134 setting for a user—search for ACL code 134 and user ID 142.
4. Add entries into compiled ACL table 45 for the new inserted ACL code 134 that impacts to the user 130 who has super access capability 120.
5. Remove entries from compiled ACL table 45 with deleted ACL code 134.
6. Add entries into compiled ACL table for the new inserted group member 142 if this group 132 is ever used in any ACL rules 44—based on group ID 132/142 and user ID 130/142.
7. Remove entries from compiled ACL table 45 with the deleted group member—search for group ID 132/142 and user ID 130/142.
8. Add entries into compiled ACL table 45 for a new individual user 130 who has super access capability 120.
9. Remove and then add entries in compiled ACL table 45 when an existing individual user 130 has user's general privilege set 154 changed.
10. Remove entries in compiled ACL table 45 for an existing individual user 130/142 who has been removed from the system users table 16.
11. Remove entries in compiled ACL table 45 for an existing group 132/142 (or public group) that has been removed from the system user group table 18.
12. Add entries into compiled ACL table 45 for an existing privilege set 154 with new inserted privilege set member privilege definition code 150 if this privilege set 154 is ever used in any ACL rules 134—search for privilege set code 154 and privilege definition code 150. If a user has his super access capability 131 changed, then remove and then add entries are needed.

13. Remove entries from compiled ACL table 45 for a deleted privilege privilege definition code 150 from an existing privilege set (privilege set code) 154. If a user 130 has super access capability 131 changed, then remove and then add entries are needed.
14. Remove entries from compiled ACL table 45 for a deleted privilege set code 154.
15. Add entries into compiled ACL table for a new defined privilege code 154 that is included into system pre-defined privilege set 48 AllPrivSet.
16. Remove entries from compiled ACL table for an existing privilege code 150 that has been removed from system pre-defined privilege set 48 AllPrivSet.

Advantages Over the Prior Art

It is an advantage of the invention that there is provided an improved system and method for authorizing access to items.

It is a further advantage of the invention that there is provided a system and method for authorizing user access to an item which does not require repetitive access to several system tables.

It is a further advantage of the invention that there is provided a system and method for authorizing user access to an item by reference to a single table which compiles ACL information from a plurality of tables.

It is a further advantage of the invention that there is provided a system and method for maintaining currency of a compiled ACL table.

It is a further advantage of the invention that there is provided a system and method for optimizing the process of maintaining currency of a compiled ACL table.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

The preferred embodiment of the invention has been described in connection with a particular set of relational database tables (FIGS. 2–11). As will be apparent to those of ordinary skill in the art, this configuration of tables is one example of alternative relational configurations.

Accordingly, the scope of protection of this invention is limited only by the following claims and their equivalents.

We claim:

1. A computer implemented method for authorizing access to an entity in a content management system by a user by reference to a single table which compiles access control information from a plurality of tables including an access control list table and a table of sets of user privileges, comprising:

binding said access control list table to each said entity;
    specifying for said user a set of user privileges;
    intersecting said access control list and said set of user privileges in a computer generated access control list (ACL) table, columns of said table including user kind, user identifier, ACL code, a privilege set comprising a privilege set code and a privilege definition code, and a group user identifier;
    incrementally refreshing said computer generated ACL table responsive to run time modification of said access control list or set of user privileges, said incrementally refreshing including, responsive to modification of said privilege set, accessing during on-line execution to affect only rows of said computer generated ACL table having a corresponding privilege set code.

2. The computer implemented method of claim 1, further comprising:

deriving said computer generated ACL table from a set of relevant tables; and
    said incrementally refreshing being selectively executed to update said computer generated ACL table responsive to run time modification of said relevant tables.

3. The computer implemented method of claim 2, said relevant tables comprising:

an users table containing user identification indicia and corresponding user privilege set indicia for at least one said user;
    an user groups table containing group user indicia and for each group user indicia at least one corresponding user identification indicia;
    an access codes table containing ACL code indicia uniquely identifying each said access control list;
    an access lists table containing access specifications, each said specification comprising said user identification indicia, said privilege set indicia, and said ACL code indicia;
    a privilege sets codes table containing privilege sets code indicia;
    a privilege definitions table containing privilege definition indicia; and
    a privilege sets table containing privilege indicia, each said privilege indicia including corresponding said privilege sets code indicia and said privilege definition indica.

4. The computer implemented method of claim 2, further comprising:

maintaining as one of said set of relevant tables an access lists table of access specifications, said specification comprising a row including user identification indicia, privilege set indicia, and ACL code indicia;
    responsive to insertion of a row to said access lists table, adding row entries to said computer generated ACL table based on said ACL code indicia and said user identification indicia.

5. The computer implemented method of claim 2, further comprising:

maintaining as one of said set of relevant tables an access lists table of access specifications, each said specification comprising a row including user identification indicia, privilege set indicia, and ACL code indicia;

responsive to updating of a row in said access lists table to change said ACL code indicia for a given user, removing and then adding entries in said computer generated ACL table for said given user.

6. The computer implemented method of claim 2, further comprising:

maintaining as one of said set of relevant tables an access lists table of access specifications, said specification comprising a row including user identification indicia, privilege set indicia, and ACL code indicia;

responsive to removal of a given row from said access lists table, removing entries from said computer generated ACL table corresponding to said ACL code indicia and said user identification indicia of said given row.

7. The computer implemented method of claim 2, further comprising:

maintaining as one of said set of relevant tables an access codes table containing ACL code indicia uniquely identifying each said access control list;

responsive to insertion of an ACL code indicia into said access codes table that impacts to a user who has super access capability, inserting a corresponding row to said computer generated ACL table.

8. The computer implemented method of claim 2, further comprising:

maintaining as one of said set of relevant tables an access codes table containing ACL code indicia uniquely identifying each said access control list;

responsive to deletion of a given ACL code indicia from said access codes table, removing entries from said computer generated ACL table with said given ACL code indicia.

9. The computer implemented method of claim 2, further comprising:

maintaining as one of said set of relevant tables an user groups table containing group user indicia and for each group user indicia at least one corresponding user identification indicia;

responsive to insertion of a group member row for a group used in any ACL rules to said users group table, adding a corresponding entry to said computer generated ACL table based on said group user indicia and said user identification indicia.

10. The computer implemented method of claim 2, further comprising:

maintaining as one of said set of relevant tables an user groups table containing group user indicia and for each group user indicia at least one corresponding user identification indicia;

responsive to deletion of a given row from said user groups table, removing entries from said computer generated ACL table corresponding to said group user indicia and said user identification indicia for said given row.

11. The computer implemented method of claim 2, further comprising:

maintaining as one of said set of relevant tables an users table containing user identification indicia and corresponding user privilege set indicia for at least one said user;

responsive to insertion of a row to said users table for a new individual user who has super access capability, adding a corresponding entry to said computer generated ACL table.

12. The computer implemented method of claim 2, further comprising:

maintaining as one of said set of relevant tables an users table containing user identification indicia and corresponding user privilege set indicia for at least one said user;

responsive to updating of a row in said users table for an individual user whose general privilege set has changed, removing and then adding corresponding entries in said computer generated ACL table.

13. The computer implemented method of claim 2, further comprising:

maintaining as one of said set of relevant tables an users table containing user identification indicia and corresponding user privilege set indicia for at least one said user;

responsive to deletion of a row for a given individual user from said users table, removing entries in said computer generated ACL table corresponding to said given individual user.

14. The computer implemented method of claim 2, further comprising:

maintaining as one of said set of relevant tables an users table containing user identification indicia and corresponding user privilege set indicia for at least one said user;

removing from said computer generated ACL table entries for groups removed from said users table.

15. The computer implemented method of claim 2, further comprising:

maintaining as one of said set of relevant tables a privilege sets table containing privilege indicia, each said privilege indicia including corresponding said privilege sets code indicia and said privilege definition indica;

responsive to insertion of a row to said privilege sets table, for a user who does not have super access capability and for privilege sets used in any ACL rules, adding entries to said computer generated ACL table for an existing privilege set with a new inserted privilege set member privilege definition indicia; and for a user who has super access capability, removing and then adding corresponding entries to said computer generated ACL table.

16. The computer implemented method of claim 2, further comprising:

maintaining as one of said set of relevant tables a privilege sets table containing privilege indicia, each said privilege indicia including corresponding said privilege sets code indicia and said privilege definition indica; and responsive to deletion of a given row from said privilege sets table, for a user without super access capability, removing from said computer generated ACL table entries corresponding to said given row; and for a user for which super access capability has changed, removing and then adding entries corresponding to said given row.

17. The computer implemented method of claim 2, further comprising:

maintaining as one of said set of relevant tables a privilege sets codes table containing privilege sets code indicia;

responsive to deletion of a row from said privilege sets codes table, removing entries from said computer generated ACL table for deleted privilege sets code indicia.

18. The computer implemented method of claim 2, further comprising:
maintaining as one of said set of relevant tables a privilege definitions table containing privilege definition indicia;
maintaining as one of said set of relevant tables a privilege sets table containing privilege indicia, each said privilege indicia including corresponding said privilege sets code indicia and said privilege definition indica;
providing a system pre-defined all privilege set privilege indicia in said privilege sets table; and
responsive to insertion into a row of said privilege sets table of newly defined privilege code indicia included in said all privilege set privilege indicia, adding a corresponding entry to said computer generated ACL table.

19. The computer implemented method of claim 2, further comprising:
maintaining as one of said set of relevant tables a privilege definitions table containing privilege definition indicia;
maintaining as one of said set of relevant tables a privilege sets table containing privilege indicia, each said privilege indicia including corresponding said privilege sets code indicia and said privilege definition indica;
providing a system pre-defined all privilege set privilege indicia in said privilege sets table; and
responsive to removal of given privilege sets code indicia from said all privilege set privilege indicia, deleting entries from said computer generated ACL table corresponding to said given privilege sets code indicia.

20. A computer system for authorizing access to an entity in content management system by a user by reference to a single table which compiles access control information from a plurality of tables including an access control list table and a table of sets of user privileges, comprising:
an access control list bound to said entity; a set of user privileges;
a computer generated access control list (ACL) table, columns of said ACL table including user kind, user identifier, ACL code, a privilege set comprising a privilege set code and privilege definition code, and a group user identifier;
a content manager for intersecting said access control list and said set of user privileges in said computer generated ACL table, and for incrementally refreshing said computer generated ACL table responsive to run time modification of said access control list or said set of user privileges, said incrementally refreshing including, responsive to modification of said privilege set, accessing during on-line execution and affecting only rows of said computer generated ACL table having a corresponding privilege set code.

21. The computer system of claim 20, further comprising:
a set of relevant tables referenced by said content manager for deriving said computer generated ACL table; and
said content manager incrementally refreshing said computer generated ACL table responsive to run time modification of said relevant tables.

22. The computer system of claim 21, said relevant tables comprising:
an users table containing user identification indicia and corresponding user privilege set indicia for at least one said user;
an user groups table containing group user indicia and for each group user indicia at least one corresponding user identification indicia;
an access codes table containing ACL code indicia uniquely identifying each said access control list;
an access lists table containing access specifications, each said specification comprising said user identification indicia, said privilege set indicia, and said ACL code indicia;
a privilege sets codes table containing privilege sets code indicia;
a privilege definitions table containing privilege definition indicia; and
a privilege sets table containing privilege indicia, each said privilege indicia including corresponding said privilege sets code indicia and said privilege definition indica.

23. A program storage device readable by a machine, tangibly embodying a program of instructions executable by a machine to perform a method for authorizing access to an entity in a content management system by a user by reference to a single table which compiles access control information from a plurality of tables including an access control list table and a table of sets of user privileges, comprising:
binding an access control list to each said entity;
specifying for said user a set of user privileges;
intersecting said access control list and said set of user privileges in a computer generated ACL table, columns of said table including user kind, user identifier, ACL code, a privilege set comprising a privilege set code and privilege definition code, and a group user identifier;
incrementally refreshing said computer generated ACL table responsive to run time modification of said access control list or set of user privileges, said incrementally refreshing including, responsive to modification of said privilege set, accessing during on-line execution and affecting only rows of said computer generated ACL table having a corresponding privilege set code.

24. The program storage device of claim 23, said method further comprising:
deriving said computer generated ACL table from a set of relevant tables; and
said incrementally refreshing being selectively executed to update said computer generated ACL table responsive to run time modification said relevant tables.

25. The program storage device of claim 24, said relevant tables comprising:
an users table containing user identification indicia and corresponding user privilege set indicia for at least one said user;
an user groups table containing group user indicia and for each group user indicia at least one corresponding user identification indicia;
an access codes table containing ACL code indicia uniquely identifying each said access control list;
an access lists table containing access specifications, each said specification comprising said user identification indicia, said privilege set indicia, and said ACL code indicia;
a privilege sets codes table containing privilege sets code indicia;
a privilege definitions table containing privilege definition indicia; and
a privilege sets table containing privilege indicia, each said privilege indicia including corresponding said privilege sets code indicia and said privilege definition indica.

* * * * *